(12) United States Patent
Urbach

(10) Patent No.: US 10,031,478 B2
(45) Date of Patent: Jul. 24, 2018

(54) APPLYING HOLOGRAPHIC EFFECTS TO PRINTS

(71) Applicant: OTOY, Inc., Los Angeles, CA (US)

(72) Inventor: Julian Michael Urbach, Los Angeles, CA (US)

(73) Assignee: OTOY, INC., Los Angeles, CA (US)

( * ) Notice: Subject to any disclaimer, the term of this patent is extended or adjusted under 35 U.S.C. 154(b) by 0 days.

(21) Appl. No.: 14/670,334

(22) Filed: Mar. 26, 2015

(65) Prior Publication Data
US 2016/0282812 A1    Sep. 29, 2016

(51) Int. Cl.
*G03H 1/08*    (2006.01)
*G03H 1/30*    (2006.01)
(Continued)

(52) U.S. Cl.
CPC ......... *G03H 1/0476* (2013.01); *G03H 1/0272* (2013.01); *G03H 1/2249* (2013.01); *G03H 2001/0055* (2013.01); *G03H 2270/13* (2013.01)

(58) Field of Classification Search
CPC ............... G03H 1/0248; G03H 1/0005; G03H 2210/30; G03H 1/0866; G03H 1/0443; G03H 1/0476; G03H 1/04; G03H 2210/32; G03H 5/00; G03H 2001/226; G03H 2210/20; G03H 2210/42; G03H 1/0272; G03H 1/2249; G03H 2001/0055; G03H 2270/13; G02B 5/1861; G03F 7/70416; B33Y 10/00; B33Y 30/00; B33Y 80/00;
(Continued)

(56) References Cited

U.S. PATENT DOCUMENTS 6,432,498 B1 *    8/2002   Ohtaki ................... G03H 1/02
                                                              359/3
2005/0052717 A1 *  3/2005   Brotherton-Ratcliffe
                                                  ............................ G03H 1/268
                                                              359/15

(Continued)

OTHER PUBLICATIONS

Hirsh, et al. "8D Display: A Relightable Glasses-Free 3D Display", TS'12, Nov. 11-14, 2012, Cambridge, Massachusetts, USA.

(Continued)

*Primary Examiner* — Jade R Chwasz
(74) *Attorney, Agent, or Firm* — James J. DeCarlo; Greenberg Traurig, LLP

(57) ABSTRACT

Lighting information comprising at least the reflectance data of a plurality of regions of an object surface is generated and printed out as a series of relightable holograms. Each of the printed holograms comprises the reflectance data of a corresponding region of the object. A model of the object is generated such that the model also comprises a plurality of portions corresponding to the regions of the object surface. The series of holograms are each affixed to a portion of the model such that a particular hologram of the series which encodes the reflectance data of a particular region of the object is affixed to the corresponding portion of the model. In an embodiment, the model of the object is generated from a metal. The series of holograms is engraved directly onto the metallic model such that a particular hologram of the series which encodes the reflectance data of a particular region of the object is engraved onto the corresponding portion of the metallic model.

17 Claims, 9 Drawing Sheets

(51) Int. Cl.
*G03H 1/04* (2006.01)
*G03H 1/02* (2006.01)
*G03H 1/22* (2006.01)
*G03H 1/00* (2006.01)

(58) Field of Classification Search
CPC ......... B33Y 50/02; B33Y 70/00; B33Y 40/00; B33Y 50/00; B33Y 99/00
USPC ....................................................... 359/1–35
See application file for complete search history.

(56) References Cited

U.S. PATENT DOCUMENTS

| | | | |
|---|---|---|---|
| 2008/0113580 A1* | 5/2008 | Johnston | A63H 33/086 446/128 |
| 2011/0242607 A1 | 10/2011 | Shenoy et al. | |
| 2012/0250123 A1 | 10/2012 | Hayashida et al. | |
| 2013/0022222 A1 | 1/2013 | Zschau et al. | |
| 2014/0168216 A1 | 6/2014 | Kim et al. | |
| 2015/0064299 A1 | 3/2015 | Koreis | |
| 2015/0190970 A1* | 7/2015 | Itagaki | G06T 15/02 700/98 |

OTHER PUBLICATIONS

O'Brien; "Relightable Dome creates interactive images where you control the light source"; Dec. 17, 2013; 7 pages http://www.engadget.com/2013/12/17/relightable-dome/ 4/.

EOS Eosint Review 2015 I Professional 3D Printer; visited Mar. 13, 2015; 2 pages http://3d-printers.toptenreviews.com/industrial/eos-eosint-review.html.

International Search Report issued in corresponding International Application No. PCT/US2016/022556, dated Jul. 5, 2016.

* cited by examiner

APPLYING HOLOGRAPHIC EFFECTS TO PRINTS

CROSS REFERENCES TO RELATED APPLICATIONS

This application is related to U.S. application Ser. No. 14/670,344 titled "RECORDING HOLOGRAPHIC DATA ON REFLECTIVE SURFACES" filed on a date even herewith and U.S. application Ser. No. 14/670,327 titled "RELIGHTABLE HOLOGRAMS" filed on a date even herewith. The entire disclosures of these applications are incorporated herein by reference.

The present disclosure relates to applying holographic effects to two dimensional and three dimensional prints.

BACKGROUND

Traditional two dimensional printers used by computers print out data row-by-row on a paper. When this method of printing was extended to print multiple layers one on top of another, it enabled printing of three dimensional models. Three dimensional (3D) printing is a process by which a computer model is translated into a physical object. Unlike traditional processes that create models via primarily subtractive processes of chiseling away material, 3D printing is an additive process wherein the physical object is built up with multiple layers of materials. As a result there is less wastage of material in addition to eliminating expensive re-tooling required to produce different models under the traditional subtractive processes. The additive processes are carried out by a 3D printer under the control of a computing device that comprises modules to carry out the printing procedure. This enables obtaining models quickly and economically before producing the actual object in a factory. As the technology matured, 3D printers are increasingly used not only to print simple models but also to print various products such as models of sophisticated machinery parts, pharmaceutical tablets or even dental crowns used by dentists.

SUMMARY

This disclosure is related to systems and methods for generating models of objects that comprise not only the depth information but also the lighting information of the object surface. A method of generating a model of an object is disclosed in some embodiments. The method can be executed by a device comprising one or more processors. The method comprises receiving, at the device comprising the processor, a series of printed holograms, each printed hologram comprising at least one holographic pixel that encodes lighting information of one of a plurality of regions of an object surface. The object can be a real object or a virtual object. The device prints a physical model of the object wherein a surface of the physical model comprises a plurality of portions each of which corresponds to a respective one of the plurality of regions of the object. In some embodiments, the model of the object is a 2-dimensional model. In some embodiments, the model of the object is a 3-dimensional model. In some embodiments, printing a physical model of the object further comprises receiving, by the device, a three dimensional image of the object and printing the three dimensional model of the of the object from the three dimensional image.

In some embodiments, the series of printed holograms are attached to the physical model such that each printed hologram is attached to that portion of the physical model which corresponds to a respective region of the object surface whose lighting information is encoded in the attached printed hologram. In some embodiments, a holographic sheet comprising at least a subset of the series of printed holograms is wrapped on the model. In some embodiments, each of the plurality of printed holograms is affixed to the respective portions of the model surface during the printing. In some embodiments, the printed series of holograms are relightable holograms. In some embodiments, an area of each portion of the printed hologram ranges between 0.000001 sq. mm. to 0.25 sq. mm.

In some embodiments, a holographic sheet comprising the series of printed holograms is disclosed. The sheet is divided into a plurality of printed holograms wherein each printed hologram comprises at least one hologram of the series. Each of the plurality of printed holograms is attached to that portion of the physical model which corresponds to a respective region of the object surface whose lighting is encoded in the attached printed hologram.

An apparatus comprising a processor and a storage medium for tangibly storing thereon program logic for execution by the processor for generating a model of an object is disclosed in some embodiments. The program logic comprises, receiving logic, executed by the processor, for receiving at the apparatus, a series of printed holograms, each printed hologram comprises at least one holographic pixel that encodes lighting information of one of a plurality of regions of an object surface. In some embodiments, the programming logic comprises, printing logic, executed by the processor, for printing a physical model of the object wherein a surface of the physical model comprises a plurality of portions, each of which corresponds to a respective one of the plurality of object regions. The programming logic further comprises attaching logic, executed by the processor, for attaching the series of printed holograms to the physical model, each printed hologram is attached to that portion of the physical model which corresponds to a respective region of the object surface whose lighting information is encoded in the attached printed hologram. In some embodiments the attaching logic comprises logic executed by the processor for wrapping a holographic sheet comprising at least two of the series of printed holograms on the model.

In some embodiments, the processor further executes dividing logic for dividing a holographic sheet comprising the series of printed holograms into a plurality of printed holograms wherein each printed hologram comprises at least one hologram of the series. The processor also executes applying logic for applying each of the plurality of printed holograms to that portion of the physical model which corresponds to a respective region of the object surface whose lighting is encoded in the attached printed hologram. In some embodiments, the processor executes image receiving logic for receiving a three dimensional image of the object and logic is executed by the processor for printing the three dimensional model of the object from the three dimensional image.

A non-transitory computer readable medium comprising processor-executable instructions is disclosed in one embodiment. The instructions comprise instructions for receiving a series of printed holograms, each printed hologram comprising at least one holographic pixel that encodes lighting information of one of a plurality of regions of an object surface. The instructions further include instructions for printing a physical model of the object wherein a surface of the physical model comprises a plurality of portions each of which corresponds to a respective one of the plurality of regions and instructions for attaching the series of printed holograms to the physical model. The instructions cause each printed hologram to be attached to that portion of the physical model which corresponds to a respective region of the object surface whose lighting information is encoded in the attached printed hologram.

In some embodiments, the instructions for attaching the printed series of holograms to the model further comprise processor-executable instructions for wrapping a holographic sheet comprising at least a subset of the series of printed holograms on the model. In some embodiments, the instructions for attaching the printed series of holograms to the model further comprise processor-executable instructions for dividing a holographic sheet comprising the series of printed holograms into a plurality of printed holograms wherein each printed hologram comprises at least one hologram of the series and instructions for applying each of the plurality of printed holograms to that portion of the physical model which corresponds to a respective region of the object surface whose lighting is encoded in the attached printed hologram.

A model of an object is disclosed in some embodiments. The model comprises a plurality of portions wherein each portion of the model corresponds to a respective one of a plurality of regions of the object. The model further comprises a plurality of holographic prints affixed to the plurality of model portions, wherein each of the holographic prints comprises lighting information of a respective one of the plurality of regions of the object. At least one of the plurality of holographic prints is affixed to one of the plurality of model portions that corresponds to the respective one of the plurality of regions of the object for which the lighting information is comprised in the at least one holographic print. In some embodiments, the lighting information comprised in the at least one holographic print is a bi-directional reflectance distribution function (BRDF) of the respective one of the plurality of object regions. An area of each of the holographic prints ranges between 0.000001 sq. mm. to 0.25 sq. mm. The model of the object can be a two-dimensional model or a three-dimensional model. In some embodiments, the properties of light reflected from a surface of the model are similar to properties of light reflected from a surface of the object.

A method of generating a 3D model of an object is disclosed in an embodiment. The method comprises obtaining a metallic model of an object. The object comprises a plurality of regions. The model is made of metal and also comprises a plurality of portions such that each portion of the model corresponds to a respective one of the regions of the object. In an embodiment, a first processor receives lighting information of the object wherein the lighting information comprises reflectance data of the object regions. The lighting information of the object is printed by the first processor, as a series of holograms, each hologram of the series comprising at least one holographic pixel that encodes the reflectance data of a respective one of the object regions. Each hologram is printed on a portion of the model that corresponds to the respective one of the object regions. In some embodiments, the model of the object is printed by a three-dimensional printer capable of printing metallic models with metals such as gold or silver.

A method of generating a metallic model comprising reflectance data of an object is disclosed in an embodiment. The method comprises, receiving, by a device comprising a processor, lighting information of an object comprising a plurality of regions, the lighting information comprising reflectance data of the portions. A model of an object is printed by the device wherein the model is made of metal and a surface of the model comprises a plurality of portions, each portion of the model surface corresponding to a respective one of the regions of the object. The lighting information of the object is transferred to the model by the device as a series of holograms, each hologram of the series comprising at least one holographic pixel that encodes a reflectance data of a respective one of the regions and each hologram is printed on a portion of the model that corresponds to the respective region.

In some embodiments, the device receives a three-dimensional image of the object and prints the three-dimensional model of the object from the three-dimensional image. Similarly, if the device receives a two dimensional image of the object a two-dimensional model of the object is printed from the two dimensional image.

A method of producing a hologram of an object comprising a plurality of regions is disclosed in an embodiment. The method comprises obtaining, from a single fixed viewpoint, a plurality of reflectance data sets of the object surface for a respective plurality of light sources. The method comprises further steps of illuminating the object surface with one of the plurality of light sources located at a particular position relative to the object and recording, a respective reflectance data of the object surface with the light source at the particular position. The light source is moved, for example, by a distance between 0.5 mm-1.0 mm to a new position adjacent to the particular position and the illuminating, the recording and the moving steps are repeated a predetermined number of times for each of the plurality of light sources.

Aggregated reflectance data is generated by a computing device for each region of the object surface by overlaying reflectance data obtained from the plurality of reflectance data sets for each region of the object surface. A light sensitive medium is illuminated with the aggregated reflectance data of at least one of the plurality of regions of the object surface and a hologram of the at least one region is manufactured from the light sensitive medium. In some embodiments, the hologram is comprised on a substrate having a region between 0.000001 sq. mm to 0.25 sq. mm.

In some embodiments, the object is a real-world object and a light stage apparatus is used to obtain the plurality of reflectance data sets. In some embodiments, the object is a virtual object and a computing device is used to obtain the plurality of reflectance data sets.

A substrate comprising a diffraction structure which is a hologram is disclosed in an embodiment. The hologram comprises a plurality of images of a virtual or real object overlaid on each other and each of the plurality of images encodes reflectance data of a region of the object surface recorded from a single view point under a respective lighting condition. In some embodiments, the substrate extends between 0.000001 sq. mm to 0.25 sq. mm. In some embodiments, the respective lighting conditions comprise at least a light source located at a respective position relative to the object and the view point. A reflected ray is generated by the hologram from light incident on the hologram from the light source, the reflected ray generated by the hologram has identical properties as a reflected ray generated by the region of the object surface when illuminated by the light source.

These and other embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
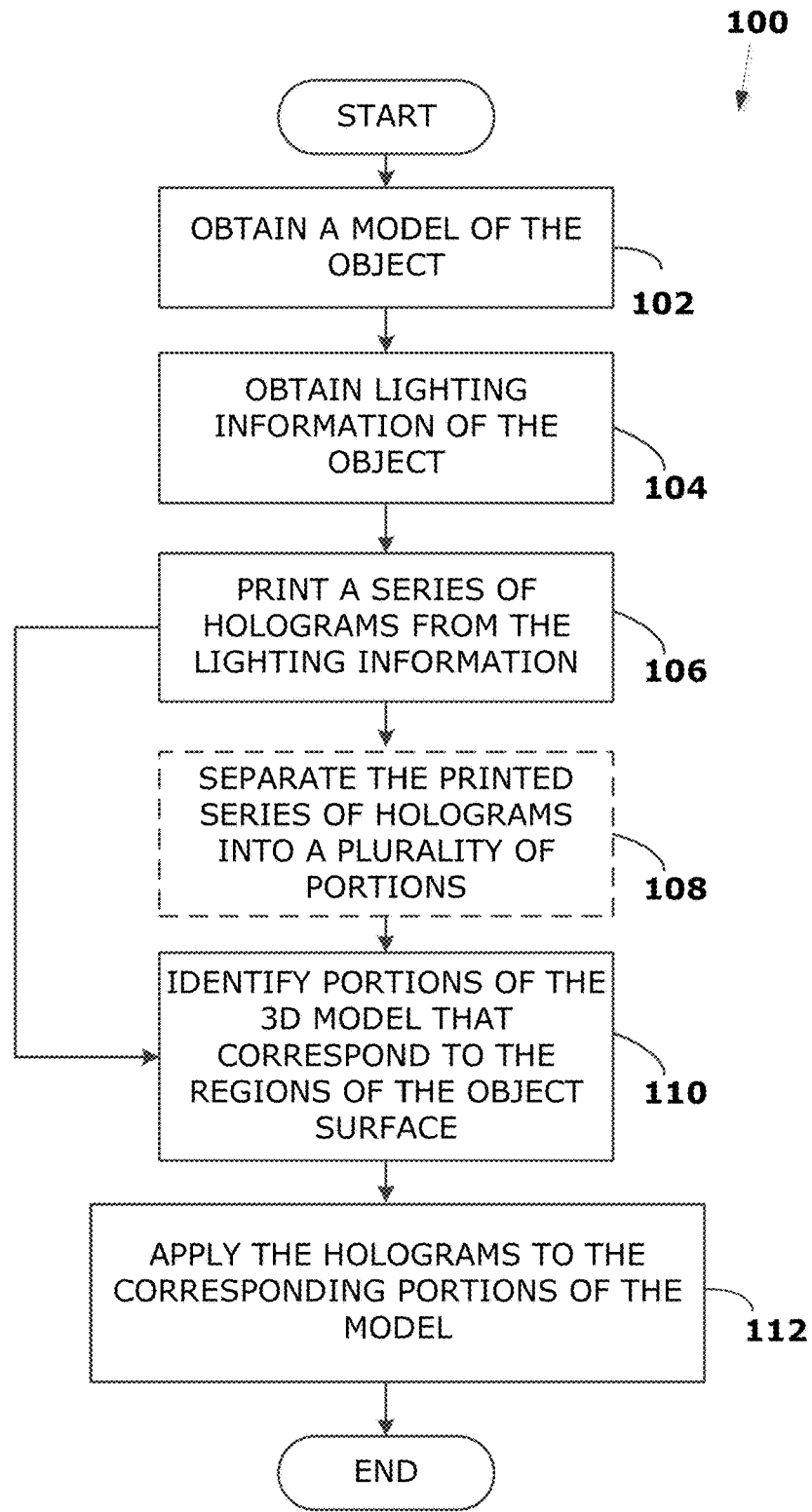
FIG. 1 is a flowchart that illustrates a methodology of generating a model of an object in accordance with some embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Improvements in printing technology transformed two dimensional printing of data on a paper into an additive process for printing three-dimensional models from image data fed to computers. Three-dimensional printers which are currently used build three-dimensional models by layering printing materials, for example, one micron at a time. Models created by three-dimensional printing can comprise robust internal structure that would otherwise not be possible with regular molds. Models can be built via the three-dimensional printing process using different materials such as, plastic, metals or resins of different colors. Despite the availability of the various colors and materials for usage in three-dimensional printing, current three dimensional printing technologies are limited to primarily printing out models whose surfaces exhibit simple reflectance, Lambertian surfaces for example, which do not convey the true reflectance behavior of the actual objects being modeled.

While a three-dimensional printer may be able to model the detailed structure of the Eiffel tower, it fails to capture in the model the true reflectance properties of the metal that makes up the actual Eiffel tower. Another example of a complex structure whose reflectance properties are not properly captured by the three-dimensional printer is the human (or other species) face. A face of a living entity comprises a complex collection of hues and shades and reflects light in complex manner that cannot be captured even with the best high-resolution three-dimensional (3D) printers. For example, three-dimensional printers with resolutions as fine as 16-30 microns are currently available. Thus, when printing a face, features such as hair and pores can be printed. However, models printed even with three-dimensional printers of the finest resolution fail to look real despite replicating the object structures accurately. This is because the light-reflectance properties of the objects are determined by a complex set of factors which not only include the physical properties such as the microscopic surface details and color of the object, but also the chemical properties of the object itself. Such details of how the object interacts with light cannot be accurately captured by 3D printed models absent the improvements set forth herein.

Technologies currently exist for capturing and recording in detail the complex light reflectance properties of objects such as the face or skin of a living being. Light stage, which will be described in detail further infra is one example. Similarly, technologies also exist to generate, by computing devices, the reflectance properties of the object. For example image based relighting techniques are used for generating photorealistic images of objects under any lighting conditions. Applications of such techniques include inter alia, insertion of characters within a scene in a movie.

Apparatus such as the dome-like light stage or a mobile light stage is used for capturing reflectance data of an object by illuminating it from different directions. A number of images of the object are captured wherein the object in each image is lit by light coming from a different direction than the other images. Hence, intensities of lights coming from the various directions can be captured for each pixel, which enables reconstructing the image of the object under any other lighting conditions not captured by apparatus such as the light stage via use of mathematical models. This can be achieved by fitting a reflectance model to the reflectance measurements obtained from light stage for the object surface. In addition, a set of reflectance measurements obtained for particular directions can be extrapolated using models such as the Lambertian, Phong or Ward models to obtain intensities for incident angles not included in the measured set.

The interaction of the various surfaces with light can be described in terms of the Bi-directional Reflectance Distribution Function (BRDF). In general, the degree to which light is reflected (or transmitted) depends on the viewer and light position relative to the surface normal and tangent. Since a BRDF is indicative of how light is reflected, it must capture the view and light-dependent nature of reflected light. Consequently, a BRDF is a function of incoming (light) direction and outgoing (view) direction relative to a local orientation at the light interaction point. However, no techniques currently exist for endowing 3D printed models with the various light reflectance properties such as those conveyed by the BRDF of the object surface.

Embodiments disclosed herein enable providing a model of an object with the light reflectance properties of the object so that the model also reflects light in a manner similar to the object thereby looking more like the actual object when compared to a model printed from a conventional 3D printer. More particularly, embodiments described herein enable recording the light interaction properties of an object and applying such properties to a model of the object. This endows the model with the light reflectance properties of the object thereby making the model look substantially identical to the object. In one embodiment, the model can be printed by the 3D printer so that the depth information of the object surface is captured in the data received by the 3D printer which it transfers to the model it prints. In one embodiment, the captured reflectance data is conveyed to the 3D printed model via the relightable holographic techniques as detailed herein. The 3D printed model which comprises both the depth and light interaction attributes of the actual object will look more realistic than a model obtained from a 3D printer.

In some embodiments, the reflectance data for the object is printed out as a relightable hologram which is affixed to the 3D printed model. Holography is a technique to record lighting information of an object and to reproduce it at a later time in the absence of the object thereby producing an illusion that the object is present. In order to generate a hologram of an object, the object is illuminated with a light source such as a coherent light source like a laser or spectrally filtered light source. The light reflected off the object is combined with a reference beam which may be direct light from the light source. The pattern resulting from the interference of the reflected beam with the reference beam is captured on a recording medium like a photograph. However, the recorded pattern captured by employing holography contains much more information than a simple focused image such as a photograph. This enables reproducing a three dimensional image of the object which causes the illusion that the object is present.

FIG. 1 is a flowchart 100 that illustrates a methodology of generating a model of an object in accordance with some embodiments. The method begins at 102 wherein a model of the object is obtained. The object can be a real object such as but not limited to a person, an animal or other real-world living/non-living object in some embodiments. In some embodiments, the object can be a virtual/imaginary object that may or may not exist in the real-world which may comprise without limitation living or non-living entities. Attributes of such virtual objects such as but not limited to, the appearance which can comprise the shape, size, colors, texture, reflectance properties, and other visible and invisible properties may be determined by their creators/designers. The model of the real or virtual object can be obtained at 102 via the subtractive or additive processes as described herein. An image of object is input to the 3D printer. Again, based on whether the object is a real object or a virtual object, the image input to the 3D printer can be a photograph from a camera or a processor-generated image. A model is generated from the received image by the 3D printer in an additive process by repeatedly layering materials such as, powdered resin. As the detailed structure of the object can be reproduced by the 3D printer, the depth information of the object's surface can be accurately represented by the 3D model. In an embodiment, the model comprises a colored surface which includes one or more of red, green blue, cyan, yellow or the like. In an embodiment, the model is made to be the same size as the object.

At 104, the lighting information of the object is obtained. The lighting information obtained at 104 can be representative of not only the reflection but also of other complex phenomenon that occur when light interacts with an object surface. This can include other phenomenon such as but not limited to light absorption and/or transmission which include without limitation diffraction and scattering effects. In one embodiment, the lighting information at 104 can be obtained from imaging apparatus such as a light stage. In an embodiment, the light stage includes in addition to other components, a camera and light sources whose intensities can be controlled. The light stage is configured for generating gradient illumination patterns. The light sources are configured and arranged to illuminate the surface of the object with the gradient illumination patterns. The light reflected from the illuminated surface of the object is received by a camera which generates data representative of the reflected light. In some embodiments, the data can comprise interference patterns for generating holograms of the object surface. In some embodiments, the data from the camera is processed by a computing system so as to estimate the surface normal map of the surface of the object.

A specular normal map and a diffuse normal map of the surface of the object can be generated separately, by placing polarizers on the light sources and in front of the camera so as to illuminate the surface of the object with polarized spherical gradient illumination patterns. In an embodiment, data from the light stage can be used to estimate other attributes of the object surface. For example, techniques for modeling layered facial reflectance consisting of specular reflectance, single scattering, and shallow and deep subsurface scattering can be employed. Parameters of appropriate reflectance models can be estimated using models as mentioned supra for each of these layers, e.g., from just 20 photographs recorded by the light stage in a few seconds from a single view-point.

In one embodiment, the lighting information at 104 can be obtained from a computing device. For example, object surface appearance can be modeled utilizing bi-directional reflectance distribution functions ("BRDFs"). As described herein, the BRDF of a surface can be evaluated from mathematical functions which are derived using analytical models. Different models can be employed for determining the reflectance characteristics of different types of materials. In fact, libraries of measured BRDF data can also be accessed from multiple sources. In one embodiment, the light interaction properties of an object surface can be calculated mathematically in a computer using path tracing. Path tracing is a computer graphics Monte Carlo method of rendering images of three-dimensional scenes. In fact, technology exists in CG (computer graphics) rendering to calculate even complex light interaction properties such as dispersion and scattering at sub millimeter resolution, such as, for 1 pixel. The lighting information of a plurality of regions of the object surface can thus be obtained at 104 via one or more of physical or mathematical procedures.

The lighting information is obtained at 104 for a plurality of regions of the object surface. In some embodiments, the lighting information can be collected at 104 for regions of the object surface. The area of each region can be determined based on the desired resolution of the resultant image. The greater the desired resolution, the smaller will be the area of each region. Accordingly, object surface can be hypothetically divided into a plurality of regions for obtaining the lighting information.

The lighting information obtained at 104 for the plurality of object regions can encode multiple viewing angles or multiple lighting conditions depending on the methodology adopted for obtaining the lighting information. For example, each pixel of a digital hologram encodes multiple viewing angles for a given light source. The lighting information for such a digital hologram is captured via incremental camera movements while keeping the object and the light source at fixed positions.

In some embodiments, the lighting information for each region of the object surface can encode multiple lighting conditions which can be used to print a relightable hologram. This can be achieved by keeping the camera and the object at fixed positions while changing the light sources and region-wise aggregation of the lighting information in accordance with embodiments as detailed further infra.

At 106, the lighting information of the regions of the object surface obtained at 104 is printed out as a series of holograms. Each hologram of the series comprises or encodes the lighting information of one of the regions of the object surface. By the way of illustration and not limitation, each hologram of the series can comprise the lighting information, such as the reflectance data of one of the regions of the object surface. Therefore, reflectance data for each region of the object surface obtained at 104 is printed out as a hologram at 106. In an embodiment, the reflectance data for each region of the object surface is represented by the BRDF. Hence, the series of holograms printed out at 106 encode the BRDFs of the regions of the object surface. The hologram printed at 106 is thereby configured to create the correct wave front so that the hologram encodes all the different lighting conditions that the object can be exposed to. In an embodiment, a single sheet comprising the series of holograms is printed out at 106. Various known methodologies such as those used by ZEBRA IMAGING can be used for obtaining the series of holograms.

In some embodiments, the method moves directly to step 110 for identifying portions of the 3D printed model that correspond to the regions of the object surface so that the appropriate lighting information can be applied to the 3D printed model. A surface of the printed 3D model can be hypothetically divided into portions in a manner similar to the object surface. By the way of illustration and not limitation, the number of regions of the object surface can be equal to the number of hypothetical portions of the 3D model surface. Therefore, each hypothetical region of the object surface corresponds to a respective portion of the model surface.

The method then proceeds to step 112 for affixing the holographic sheet to the model, thus step 108 can be eliminated. At 112, the sheet of holograms generated at 106 is attached to the 3D printed model such that each of the holograms that comprises lighting data of one particular region of the object surface corresponding to a particular portion of the model is positioned and affixed to that particular portion of the model. For example, the sheet of holograms can be positioned and shrink wrapped over the model such that a particular hologram that comprises lighting data of a specific region of the object surface is affixed to the corresponding portion of the model.

In some embodiments, the method moves to step 108, wherein the sheet comprising the series of holograms is cut up or divided into a plurality of segments or a plurality of holographic flakes. In an embodiment, the sheet is divided such that each segment or flake comprises one hologram of the printed series of holograms. As a result of such separation, a plurality of printed holograms are obtained at 108 wherein each printed hologram comprises reflectance data of one of the regions of the object surface. Again, it can be appreciated that the number of printed holograms or holographic flakes generated at step 108 can be equal to the number of object surface regions or correspondingly the number of model surface portions. By the way of illustration and not limitation, the area of the printed holograms obtained at 108 can extend between 0.000001 sq. mm. to 0.25 sq. mm. In an embodiment, the sheet can be divided such that a piece of the sheet comprises two or more holograms. Hence, it may be appreciated that the pieces of holograms generated at 108 can comprise one or more holograms each of which encodes reflectance data of respective regions of the object surface.

In some embodiments, the method moves from step 108 to 110 wherein the portions of the 3D model corresponding to the regions of the object surface are identified. The flakes of the holographic sheet generated at 108 are attached or affixed to the corresponding portions of the model at 112. Since the 3D printing process is an additive process, a 3D printer can be programmed to affix the flakes of the holographic sheet to the corresponding portions of the 3D model as the final layer of the model is being printed. For example, a mechanical inkjet of the 3D printer can be programmed to eject the plurality of flakes of the holographic sheet when building the respective portions of the 3D model.

As a result of the process detailed in FIG. 1, a 3D printed model is obtained which not only conveys the depth information of an object surface but is further endowed with the reflectance properties of the object surface. When light is incident on such 3D printed model, it is reflected in a manner that is substantially identical to the actual object. This is because the holographic pieces on the model are encoded with the reflectance properties of the actual object surface and accordingly mimic the reflectance properties of the object surface.

It can be appreciated that the procedures of the holographic sheet being wrapped as a whole or being separated are described separately in the flowchart 100 only by the way of illustration and not limitation. In fact, the steps need not be mutually exclusive when generating a 3D model and may be used together when generating a single 3D model. For example, there can be portions where a holographic sheet comprising multiple holograms is affixed or wrapped around a portion of the 3D model while segments or flakes of the holographic sheet comprising individual holograms are affixed to other portions of the same 3D model.

Figure 2:
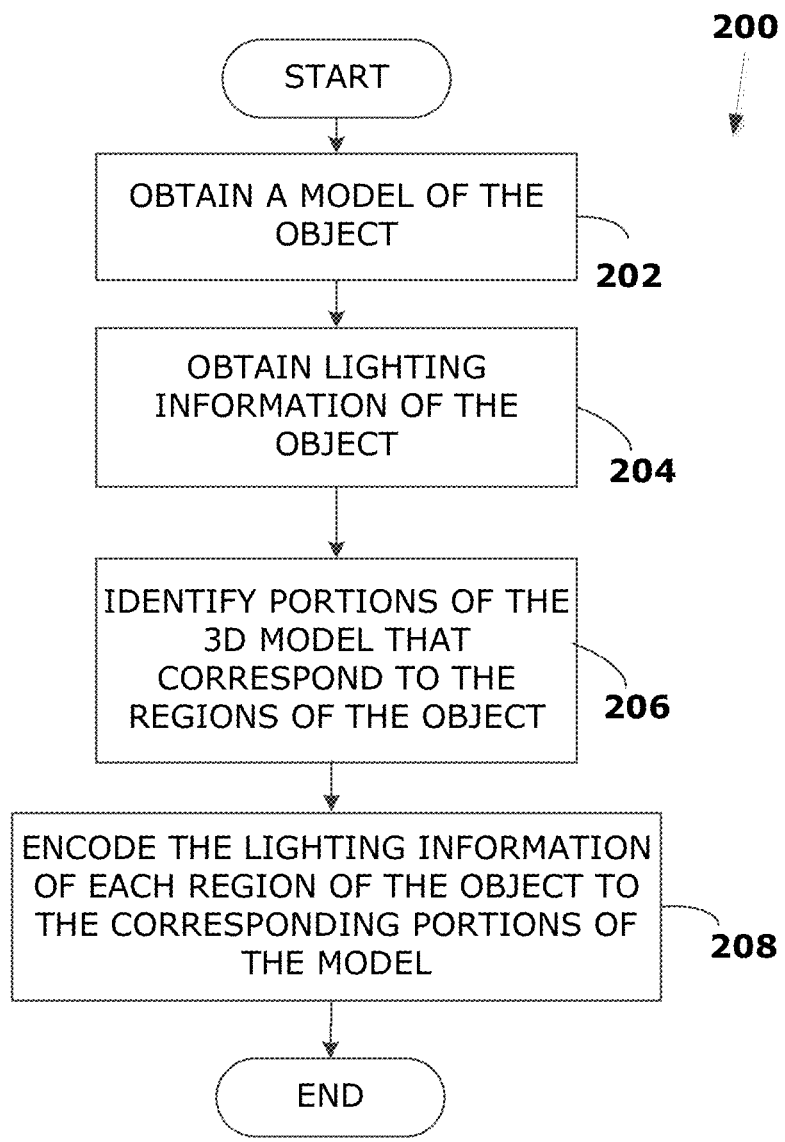
FIG. 2 is a flowchart that details a methodology of generating a model of an object in accordance with some embodiments.

FIG. 2 is a flowchart 200 that details a methodology of generating a model of an object in accordance with some embodiments. The method begins at 202 wherein a model made of a reflective material such as a metal is obtained. The model can be made of metals such as gold or silver. In some embodiments, the model is the same size as the object and can be obtained via additive processes from a 3D printer or by etching or chiseling a metal block/sheet. At 204, the lighting information comprising reflectance data of regions of the object is obtained. In an embodiment, the reflectance data obtained at 204 is similar to the reflectance data obtained at 104. In an embodiment, if the reflectance data of the object is recorded at 104 then such data can be reused thereby rendering step 204 redundant. At 206, various portions of the model surface that correspond to a respective region of the object are identified. In an embodiment, the model surface can be the same size as the object region and accordingly, the plurality of portions identified on the model can be the same size as the regions identified on the object surface. At 210 the lighting information obtained for each region of the object surface is encoded on the corresponding portion of the model surface.

In an embodiment, the lighting information comprises reflectance data for the region for light rays incident on the region from different directions. Thus, the reflectance data for a plurality of lighting conditions is encoded on the model surface for each region. In an embodiment, the model can be printed by the 3D printer and the lighting information which includes the reflectance data can be etched on it for example, by a holographic printer.

In an embodiment, the reflectance data can comprise the BRDF of each region of the object surface and the holographic printer can etch a diffraction grating on the surface of the metallic model which changes the refractive index of the model surface. When the metallic model is illuminated by a light source which serves as a reference beam, the diffraction grating will be operative to produce a hologram which reflects light in a manner that mimics the light reflection by the object. This mitigates the need for printing, dividing and attaching the holographic film to the model surface as described in FIG. 1. In an embodiment, the metallic model as described herein can be used to model metallic objects.

Figure 3:
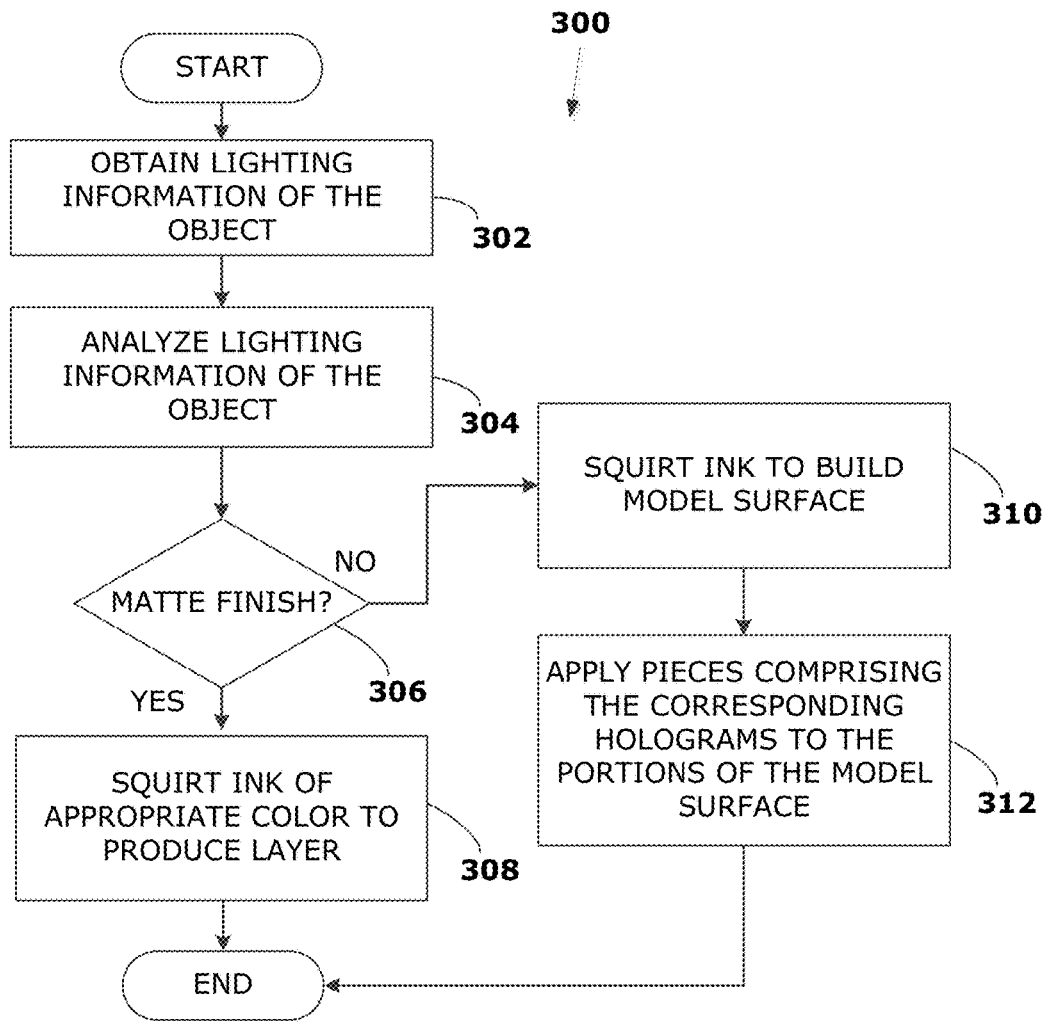
FIG. 3 is a flowchart that details the method of generating a model of an object in accordance with some embodiments.

It may be appreciated that different portions of an object surface may possess different attributes. While some regions of the object surface can be diffusive other portions of the object surface may be glossier. Accordingly, FIG. 3 is a flowchart 300 that details the method of generating a model of an object in accordance with some embodiments. The method begins at 302 wherein the lighting information comprising, for example, the reflectance data of a region of the object surface is obtained by a computing device attached to a 3D printer. In an embodiment, the reflectance data of the object is obtained using apparatus such as the light stage. In an embodiment, the reflectance data is analyzed by the computing device at 304 to determine the nature of the object surface. At 306, it is determined if the object surface has a matte finish or if the object surface has a more glossy finish based on the analysis at 304. For example, if the reflectance data fits the Lambertian model, it may be determined at 306 that the object surface has a matte finish else it can be determined that the object surface has a glossy finish. If the object surface has a matte finish, then the ink of the appropriate color can be squirted to generate a layer of the 3D model as shown at 308. If it is determined that the portion of the object surface of the object is glossier, that particular portion of the object surface is printed or built up by squirting ink at 310 and subsequently, the holographic data is applied at 312, for example, by attaching tiny flakes of a holographic film in accordance with embodiments described herein. Hence, it may be appreciated that an entire model does not need to be covered by the holographic print in accordance with the embodiments described herein. Rather, portions of the model surface corresponding to the glossier surfaces of the objects may be covered with the holographic prints that are generated in accordance with embodiments detailed further infra while portions of the model corresponding to more diffusive object surfaces may receive matte finish via regular 3D printing.

Figure 4:
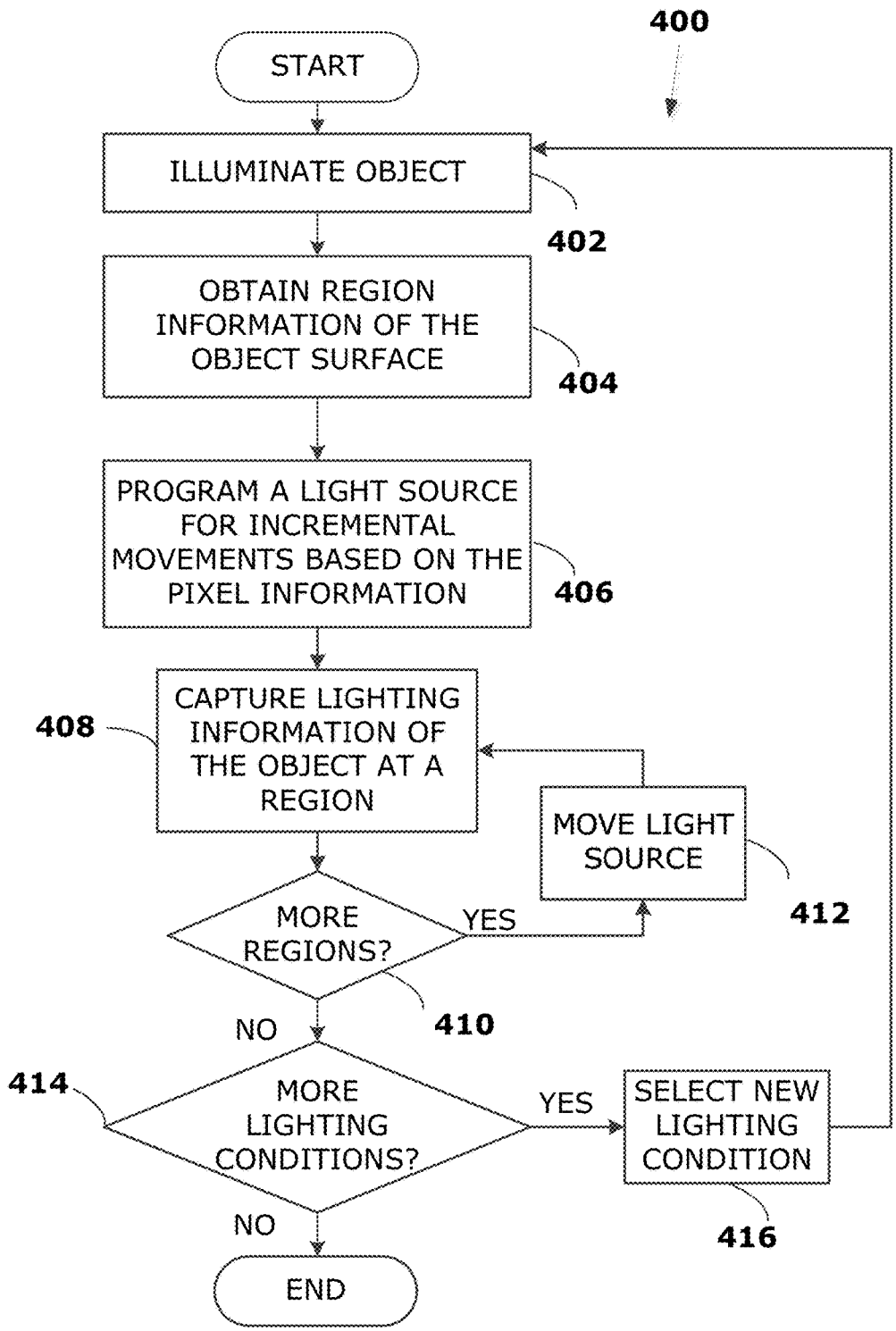
FIG. 4 shows a flowchart that details a methodology of generating the lighting information for a relightable hologram which can be used with the 3D printed model of the object in accordance with some embodiments.

In some embodiments, relightable holograms are used for the glossier surfaces as detailed in FIG. 3. Generally holograms encode varying viewpoints under fixed lighting conditions. For example, given a fixed object and a light source, a camera is programmed for microscopic, incremental movements to generate data for printing out a digital hologram. Therefore, when a viewer changes a viewing position when looking at the printed hologram, the hologram appears to have moved to the viewer. FIG. 4 shows a flowchart 400 that details a methodology of generating the lighting information for a relightable hologram which can be used with the 3D printed model of the object in accordance with some embodiments. A relightable hologram in accordance with some embodiments, encodes multiple lighting conditions from a single view point. In accordance with some embodiments, the reflectance data is collected physically for the relightable hologram by maintaining a real-world object and the camera in fixed positions while moving the light source(s) around the object. Apparatus such as known in the art for collecting the reflectance data can comprise without limitation, a light stage or a portable light stage which may be used to execute a method as detailed in FIG. 4 for example. In some embodiments, the reflectance data can be generated entirely by a computing device for either the real-world object or a virtual object for a plurality of lighting conditions. In some embodiments, the reflectance data can also be partially generated by programming the computing device to extrapolate the data obtained for a real-world object for a subset of the plurality of lighting conditions using known mathematical models.

Collecting reflectance data for a real-world object using a physical procedure begins at 402 wherein the object whose lighting information is to be collected is illuminated from one or more directions with one or more light source(s). In some embodiments, the light source(s) is fixed to the dome-like structure of the light stage and the object is placed in the middle of the dome. In other embodiments the light sources are independently mobile. At 404, the region information of the object surface is obtained. For example, the regions can comprise microscopic areas on the object surface wherein the number of pixels comprised in an image of the region or microscopic area is estimated for example, by a computing device. The light source(s) used to illuminate the object is programmed to move at 406 based on the region information obtained at 404. In an embodiment, the light source is programmed for minute movements ranging from 0.5 mm-1.0 mm and the number of times the light source moves may depend on the number of regions on the object surface. For example, if the desired resolution of an image of the object surface is 300 PPI (pixels per inch), the light source can be moved 300 times per inch when collecting the reflectance data of the object surface. At 408, the lighting information of a region of the object surface is captured. In an embodiment, the lighting information can comprise the data associated with the reflectance of the plurality of light rays originating from the plurality of light sources and incident on a region of the object surface.

When the lighting information of a region is obtained at 408, it is determined at 410 if there are more regions whose lighting information needs to be collected. If yes, the light source is moved as shown at 412 and the procedure returns to 408 wherein the lighting information of the next region is obtained. The loop comprising steps 408, 410 and 412 can be repeated until all the regions of the object surface are imaged. At 414, it is determined if more lighting conditions exist that need to be applied to the object for collecting the reflectance data. If yes, the method moves to 416 wherein the new lighting conditions are selected. New lighting conditions selected at 416 can comprise without limitation, different light sources wherein various values of RGB can be applied to the object for obtaining further reflectance data. Upon selecting the new lighting conditions at 416 the method loops back to step 402 wherein the object is illuminated with the newly selected lighting conditions and reflectance data is obtained by moving the light sources as detailed supra.

Figure 5:
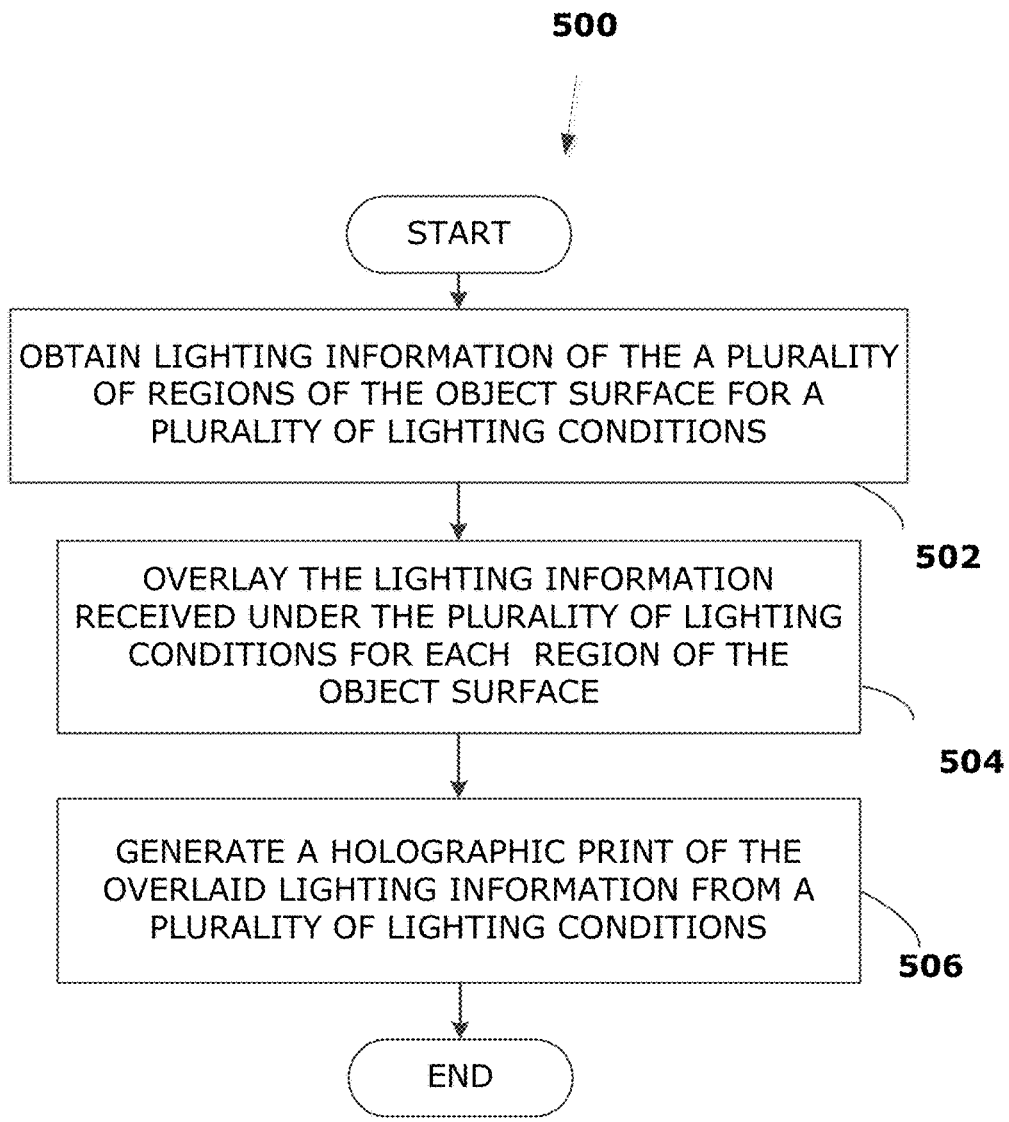
FIG. 5 details a method of generating a relightable hologram in accordance with some embodiments.

The imaging procedure described in FIG. 4 generates numerous images of the object for each lighting condition. For example, the procedure of FIG. 4 when executed for a single lighting condition can generate approximately 8000 images. FIG. 5 details a method of generating a relightable hologram in accordance with some embodiments. The method begins at 502 with obtaining lighting information of a plurality of regions of the object under a plurality of lighting conditions as detailed in FIG. 4. In an embodiment, region-wise reflectance data can be obtained at 502 as a series of images of the object illuminated by one or more light sources from different positions. At 504, the lighting information of the plurality of regions of the object surface thus obtained is aggregated. In some embodiments, images of each region of the object that were collected under the plurality of lighting conditions are overlaid on each other to aggregate the lighting information. As the images are taken from a single camera view point (albeit different lighting conditions) the object appears to be lit by white light when they are overlaid on each other. This is in contrast to the traditional methodology of collecting lighting information from a plurality of viewpoints for generating a digital hologram wherein aggregating such lighting information would result in fuzzy, out-of-focus images. It may be appreciated by those skilled in the art that for minute areas or regions of the object surface as described herein, the view angle may not make as significant contribution to the appearance of the model as proper reflectance would.

A holographic print of the aggregated lighting information for each region of the object is obtained at 506. In some embodiments, the aggregated lighting information for each of the plurality of regions is recorded on a light sensitive medium from which the holographic print is generated using known methods. Examples of photo-sensitive media that can be used to generated holograms can comprise without limitation photographic emulsions, photopolymers, photoresists and similar substances. The holographic print obtained at 506 comprises a plurality of relightable holograms each of which encodes multiple lighting conditions for each region of the object as opposed to multiple viewing angles that are encoded in a normal holographic pixel. Thus, while a normal hologram is able to provide image data from different viewing angles, a relightable hologram in accordance with embodiments described herein provides reflectance data when illuminated by the appropriate lighting conditions.

In some embodiments, if the relightable hologram generated at 506 is lit with a light source from a direction substantially similar to those present when the reflectance data was collected, then the light is reflected in a substantially similar manner as the object whose light interactions were recorded at 502. Thus, when a 3D model of an object is covered with relightable holograms as described herein, the depth and light interaction data are both captured thereby generating a more realistic replica of the object than what would otherwise have been generated by just the 3D printer.

Figure 6:
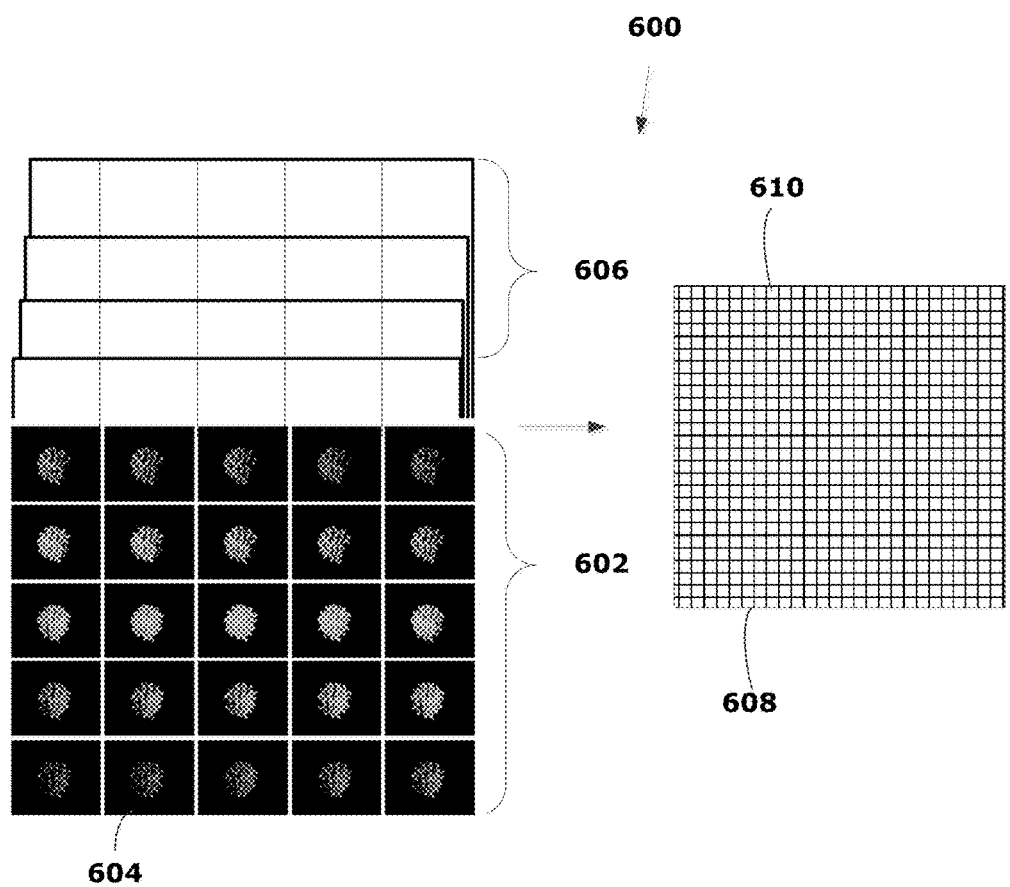
FIG. 6 is an illustration that depicts the lighting information comprising a series of images obtained for a person in accordance with some embodiments.

FIG. 6 is an illustration 600 that depicts the lighting information comprising a series of images 602 of an object obtained in accordance with some embodiments. One or more light sources can be programmed for minute movements while the camera and the object remain in fixed positions. It can be appreciated the image series 602 with 25 images is shown and discussed herein only by the way of illustration and not limitation. Any number of images can be generated for the image series 602 based on the various positions of the light source(s). Each image 604 of the plurality of images 602 captures the lighting information of the regions or microscopic areas of the object for a given position of the light source(s). The plurality of images 602 were generated by moving serially the light sources, for example, from the left side of the object to its right side while keeping the object and camera in fixed positions. Accordingly, considering the series of images 602 as a 5×5 matrix, the image at the position 5×5 is a mirror image of the image at the position 1×1. A plurality 606 of such image series can be generated by employing a plurality of lighting conditions. Light sources with varying attributes such as but not limited to the intensities, color/wavelength, type of light can be used to generate the plurality 606 of image series.

The lighting information from each corresponding individual image 604 from each series 602 of the plurality 606 of series for a given image pixel are overlaid and the resulting images are printed out as a sheet of relightable holograms 608 comprising a plurality of tiny holograms 610 in accordance with some embodiments. For example, assuming each image at the position 1×1 in the plurality of series 606 is indicative of the lighting information of the imaged object surface when the light sources and the object are at a particular position, a relightable hologram of the object surface is generated by superimposing or overlaying each of the 1×1 images from the plurality of image series 606. Thus, a relightable hologram is generated by superimposing the each N×N image indicative of a particular light-source/object position with other images indicative of the same position from the various images series 606.

As each hologram 610 of the relightable hologram 608 that encodes lighting information of a plurality of lighting conditions of a single corresponding region of the object surface, applying one of the plurality of lighting conditions on the sheet of relightable hologram 608 results in a view that would substantially replicate what the object surface looks like when lit under that lighting condition. The effect can be further enhanced to look more realistic by application of the relightable holographic pixels on a 3D printed model of the object surface. The process as outlined in embodiments herein can aid in generating a more realistic replica of objects such as but not limited to a person's face which can thus be generated from the 3D printed model that is endowed with not only the depth information but also with the person's facial reflectance data.

Figure 7:
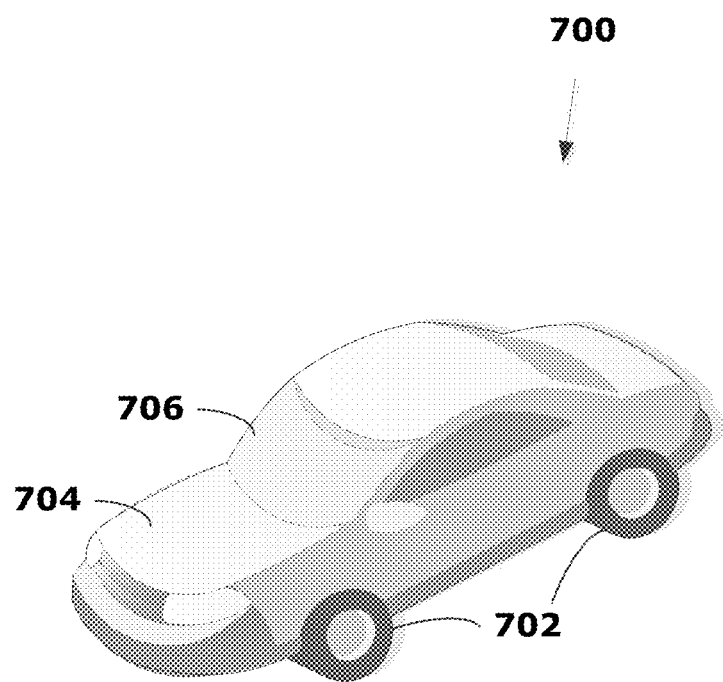
FIG. 7 shows a model of an object generated in accordance with embodiments detailed herein.

FIG. 7 shows a model 700 of an object generated in accordance with embodiments detailed herein. In some embodiments, the depth and lighting information of the object can be obtained by executing a physical data collection process employing tools such as the light stage. The physical structure of the model that shows the depth information is produced by a 3D printer. The lighting information is transferred to the model via the holographic sheet comprising the relightable holograms as detailed herein. Based on the lighting information of the object, there can be certain portions such as for example, the tires 702 of the model 700 that can have matte finish and do not require holograms while other portions such as the body 704 and windshield 706 of the car have holographic flakes/sheet affixed thereto.

Figure 8:
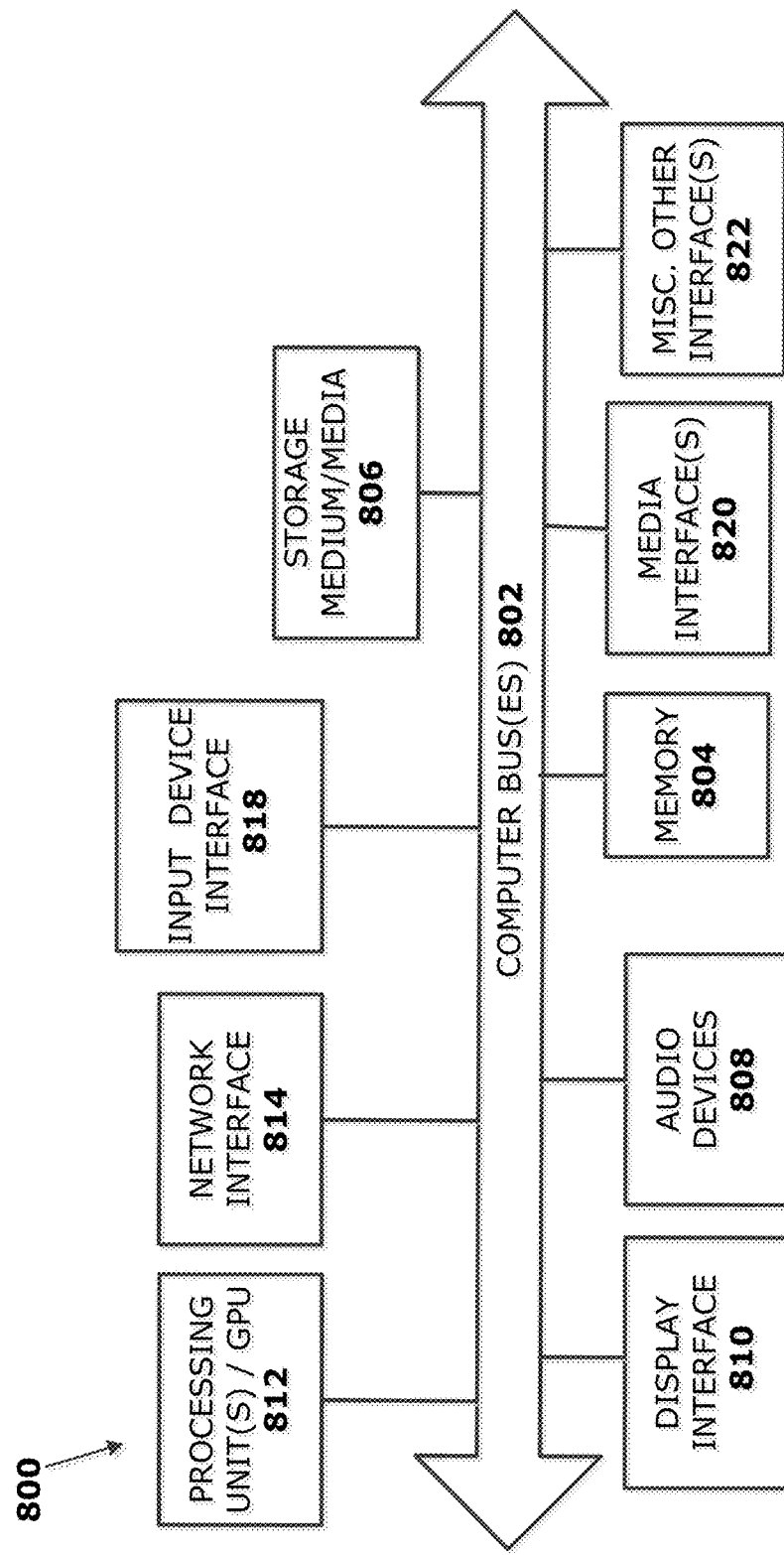
FIG. 8 illustrates internal architecture of a computing device in accordance with some embodiments.

FIG. 8 illustrates internal architecture of a computing device 800 in accordance with some embodiments. The computing device 800 or another device substantially similar to it can comprise modules to generate a model and the attributes of a virtual object by an artist for further modelling in accordance with embodiments described herein. The computing device 800 can be further configured to include programming logic for generating reflectance data of a virtual object or a real object. In some embodiments, certain reflectance information of the real object can be obtained via executing a physical procedure as detailed herein while other reflectance information can be generated by programming logic executed by the computing device 800. In some embodiments, the computing device 800 can also be used to operate a data gathering apparatus such as a light stage as detailed herein. Moreover, the computing device 800 can include modules to drive a printer which can comprise without limitation, a 3D printer to print a 3D model of the object and attach the holographic sheet comprising the lighting information to the printed model.

The internal architecture of the computing device includes one or more processing units (also referred to herein as CPUs) 812, which interface with at least one computer bus 802. Also interfacing with computer bus 802 are persistent storage medium/media 806, any audio devices 808, network interface 814, memory 804, e.g., random access memory (RAM), run-time transient memory, read only memory (ROM), etc., media disk drive interface 820 for a drive that can read and/or write to media including removable media such as floppy, CD-ROM, DVD, etc., media, display interface 810 as interface for a monitor or other display device, input device interface 818 for input devices such as a keyboard, pointing devices such as a mouse and miscellaneous other interfaces 822 not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads software modules for the computer-executable process steps from storage, e.g., memory 804, storage medium/media 806, removable media drive, and/or other storage device. CPU 812 can then execute the software modules in order to execute the computer-executable process steps. Stored data, e.g., data stored by a storage device, can be accessed by CPU 812 during the execution of computer-executable process steps.

Persistent, non-transitory storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, content and other files. Persistent storage medium/media 806 can further include program modules and data files used to implement one or more embodiments of the present disclosure.

Figure 9:
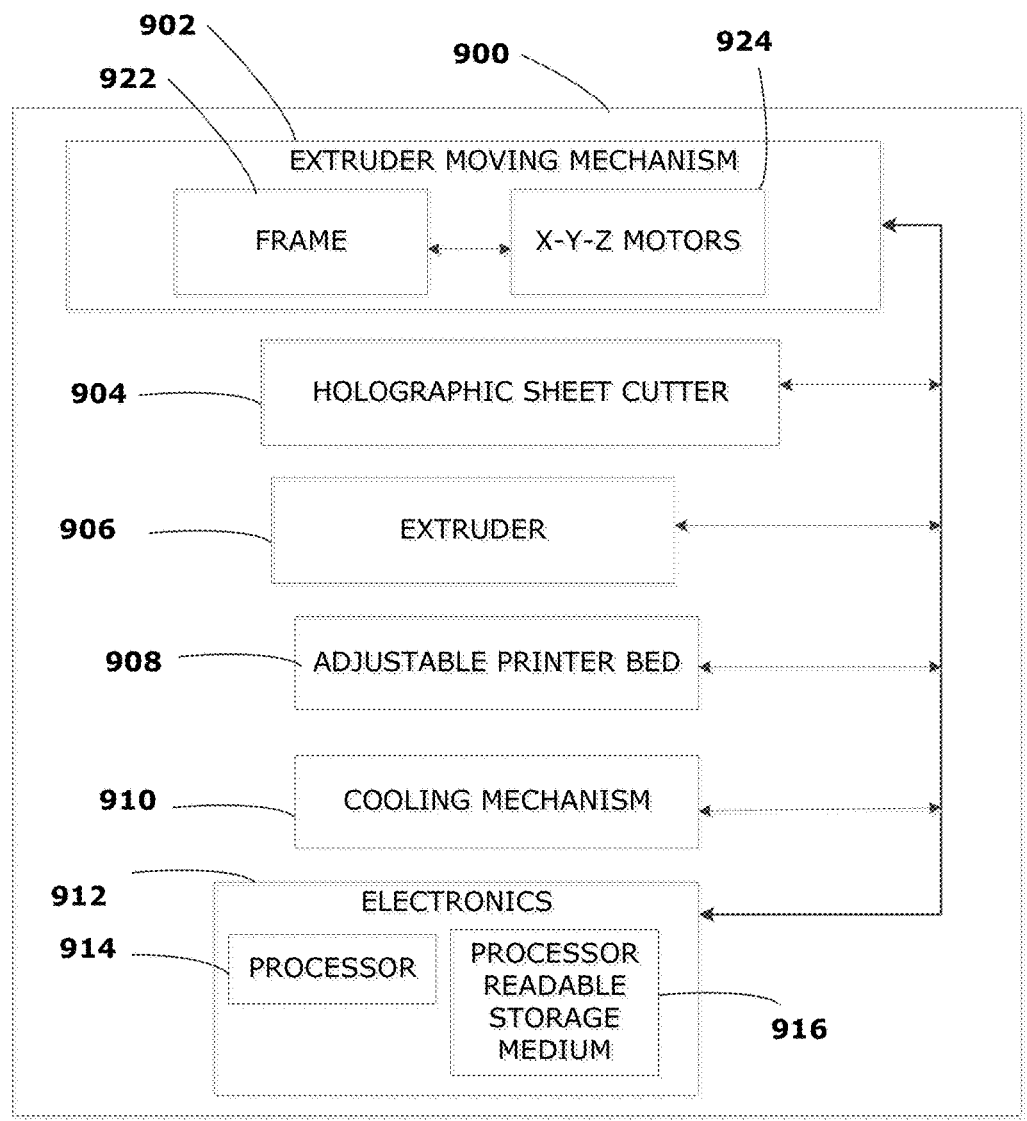
FIG. 9 illustrates a 3D printer apparatus for printing 3D models in accordance with some embodiments.

FIG. 9 is a 3D printer 900 for printing 3D models with holographic data in accordance with some embodiments described herein. As described supra, the 3D printer 900 can be connected to a controller, such as, a computing device 900 that provides the software for generation and/or selection of the models to be printed. Specialized 3D printing software packages are available that enable generating the models on a display screen of the computing device 900. Based on the model generated/selected by the user, the computing device 900 can control the 3D printer 900 to produce or print the model. Although shown as disparate units herein, it can be appreciated that the computing device 800 can also be integrated with the 3D printer to form a single unit in accordance with some embodiments.

The electronics 912 of the 3D printer 900 comprises at least a processor 914 and a non-transitory processor or computer readable non-transitory storage medium 916. The processor 914 controls the various parts of the 3D printer 900 based on the programming logic stored on the non-transitory storage medium 916 to produce 3D printed models with holographic data attached thereto. A sheet comprising a plurality of relightable holograms that comprise lighting information of the object surface to be printed is fed to the holographic sheet cutter 904 for separation into a plurality of printed holograms for attaching to the 3D printed model as it is being printed. In some embodiments, the plurality of printed holograms can be obtained externally from a disparate apparatus for separation into a plurality of printed, relightable holograms.

The plurality of printed, relightable holograms obtained either from the cutter 904 or externally in accordance with embodiments described herein are fed to the extruder 906. The extruder 904 is made up of an extruding mechanism comprising a tank to contain the 3D printing ink which can include plastics like colored resins and a nozzle to extrude the 3D printing ink to produce the 3D printed model. The extruding mechanism can be further adapted to emit or output each of the relightable holograms of the series as the corresponding portion of the model is printed. In some embodiments, the electronics 912 of the 3D printer 900 is programmed to enable the extruder 904 to emit particular relightable holograms as the outer surface of the corresponding portion of the 3D model is printed.

The adjustable printer bed 908 in combination with the extruder moving mechanism 902 enables 3D printing by the extruder 2004. The extruder moving mechanism 902 can comprise one or more adjustable frames 922 and X-Y-Z motors 924. The extruder 902 is mounted on the frames 922 that are fitted with the X-Y-Z motors that enable moving the extruder 904 along one or more of the X-Y-Z axes on the frames 922. In addition, the adjustable printer bed 908 onto which the extruder 906 emits the ink can be adjusted adding another dimension of flexibility to the 3D printer 900. A cooling mechanism 910 such as a fan is also included in the 3D printer 900 so that upon being printed, the 3D model is cooled. The 3D printer 900 is therefore able to print realistic models with depth information and lighting information in accordance with embodiments described herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   printing, at a device comprising a processor with a first physical material, a holographic sheet comprising a series of holograms, each hologram of the series comprising at least one holographic pixel that encodes lighting information of a respective one of a plurality of regions of an object surface different from that of others of the plurality of regions;
   dividing, by the device, the printed holographic sheet into a plurality of separate physical holographic flakes, each holographic flake comprising a respective hologram of the series encoding the lighting information of the respective one of the plurality of regions of the object surface, the number of the divided holographic flakes being equal to the number of the plurality of regions of the object surface;
   printing, by the device, a physical model of the object with a second physical material, a surface of the physical model comprising a plurality of portions, each portion corresponding to the respective one of the plurality of regions of the object surface; and attaching, by the device, the holographic flakes to the surface of the printed physical model, each holographic flake attached to that portion of the physical model which corresponds to the respective one of the plurality of regions of the object surface.

2. The method of claim 1, wherein attaching the printed series of holograms to the model further comprises:
wrapping a holographic sheet comprising at least a subset of the series of printed holograms on the model.

3. The method of claim 1 wherein the model of the object is a 3-dimensional model.

4. The method of claim 3, printing a physical model of the object further comprising:
receiving, by the device, a three dimensional image of the object; and
printing, by the device, the three dimensional model of the of the object from the three dimensional image.

5. The method of claim 4, each of the plurality of printed holograms that comprises lighting information of the respective region of the object surface is affixed to the corresponding portion of the model during the printing.

6. The method of claim 1, wherein the printed series of holograms are relightable holograms.

7. The method of claim 1 wherein the model of the object is a 2-dimensional model.

8. The method of claim 1, wherein an area of a printed hologram ranges between 0. 000001 sq. mm. to 0.25 sq. mm.

9. The method of claim 1, wherein the object is a real-world object.

10. The method of claim 1, wherein the object is a virtual object.

11. An apparatus comprising:
a processor;
a storage medium for tangibly storing thereon program logic for execution by the processor, the program logic comprising:
printing logic, executed by the processor, for printing at the apparatus with a first physical material, a holographic sheet comprising a series of holograms, each hologram of the series comprising at least one holographic pixel that encodes lighting information of a respective one of a plurality of regions of an object surface different from that of others of the plurality of regions;
dividing logic, executed by the processor, for dividing the printed holographic sheet into a plurality of separate physical holographic flakes, each holographic flake comprising a respective hologram of the series encoding the lighting information of the respective one of the plurality of regions of the object surface, the number of the divided holographic flakes being equal to the number of the plurality of regions of the object surface;
printing logic, executed by the processor, for printing a physical model of the object with a second physical material, a surface of the physical model comprising a plurality of portions, each portion corresponding to a respective one of the plurality of regions of the object surface; and
attaching logic, executed by the processor, for attaching holographic flakes to the surface of the printed physical model, each holographic flake attached to that portion of the physical model which corresponds to the respective one of the plurality of regions of the object surface.

12. The apparatus of claim 11, wherein attaching the printed series of holograms to the model further comprises:
logic executed by the processor for wrapping a holographic sheet comprising at least two of the series of printed holograms on the model.

13. The apparatus of claim 11, the model of the object being a 3-dimensional model.

14. The apparatus of claim 13, the program logic further comprising:
image receiving logic, executed by the processor, for receiving a three dimensional image of the object; and
logic executed by the processor for printing the three dimensional model of the of the object from the three dimensional image.

15. The apparatus of claim 11, wherein the printed series of holograms are relightable holograms.

16. A non-transitory computer readable storage medium comprising processor-executable instructions for:
printing, with a first physical material, a holographic sheet comprising a series of holograms, each hologram of the series comprising at least one holographic pixel that encodes lighting information of a respective one of a plurality of regions of an object surface different from that of others of the plurality of regions;
dividing the printed holographic sheet into a plurality of separate physical holographic flakes, each holographic flake comprising a respective hologram of the series encoding the lighting information of the respective one of the plurality of regions of the object surface, the number of the divided holographic flakes being equal to the number of the plurality of regions of the object surface;
printing a physical model of the object with a second physical material, a surface of the physical model comprising a plurality of portions, each portion corresponding to a respective one of the plurality of regions of the object surface; and
attaching the holographic flakes to the surface of the printed physical model, each holographic flake attached to that portion of the physical model which corresponds to the respective one of the plurality of regions of the object surface.

17. The computer readable storage medium of claim 16, the instructions for attaching the printed series of holograms to the model further comprise processor-executable instructions for:
wrapping a holographic sheet comprising at least a subset of the series of printed holograms on the model.

* * * * *